United States Patent
King et al.

(10) Patent No.: US 6,982,057 B2
(45) Date of Patent: Jan. 3, 2006

(54) MULTI-LAYER ROTATIONAL PLASTIC MOLDING

(75) Inventors: Nathan King, Inver Grove Heights, MN (US); Jennifer Schwiebert, Maple Grove, MN (US); John Morgan, Cedar, MN (US); Gary Engen, Mounds View, MN (US)

(73) Assignee: Solar Plastics, Inc., Delano, MN (US)

( * ) Notice: Subject to any disclaimer, the term of this patent is extended or adjusted under 35 U.S.C. 154(b) by 337 days.

(21) Appl. No.: 10/298,042

(22) Filed: Nov. 15, 2002

(65) Prior Publication Data

US 2004/0096608 A1    May 20, 2004

(51) Int. Cl.
*B29C 41/04*    (2006.01)

(52) U.S. Cl. ............... 264/255; 264/310; 264/311; 425/144; 425/270; 425/435

(58) Field of Classification Search ............... 264/255, 264/310, 311; 425/144, 270, 435

See application file for complete search history.

(56) References Cited

U.S. PATENT DOCUMENTS

| | | | | |
|---|---|---|---|---|
| 4,043,721 A | * | 8/1977 | Lemelson | 425/116 |
| 4,106,745 A | * | 8/1978 | Carrow | 249/97 |
| 4,548,779 A | * | 10/1985 | Steinberg et al. | 264/255 |
| 5,529,481 A | * | 6/1996 | Guzikowski | 425/434 |
| 6,383,437 B1 | | 5/2002 | Grieve | 264/246 |

FOREIGN PATENT DOCUMENTS

| | | | |
|---|---|---|---|
| GB | 1150018 | * | 4/1969 |
| GB | 2 341 340 A | * | 3/2000 |

* cited by examiner

*Primary Examiner*—Stefan Staicovici
(74) *Attorney, Agent, or Firm*—Schwegman, Lundberg, Woessner & Kluth, P.A.

(57) ABSTRACT

A multi-layer rotational-molded plastic article has an area, such as a sight line for viewing content levels, where an inside layer protrudes through the outside layer and may be bonded to it. A first flowable material such as plastic resin is introduced into a mold having an insulating member extending through an aperture or slot into the mold. The mold is rotated and heated to less than full cure. The insulating member is removed, a second, transparent flowable material is introduced into the mold, and a cover member replaces the insulating member. The mold is rotated and heated to cure both resins, and only then cooled and opened.

36 Claims, 4 Drawing Sheets

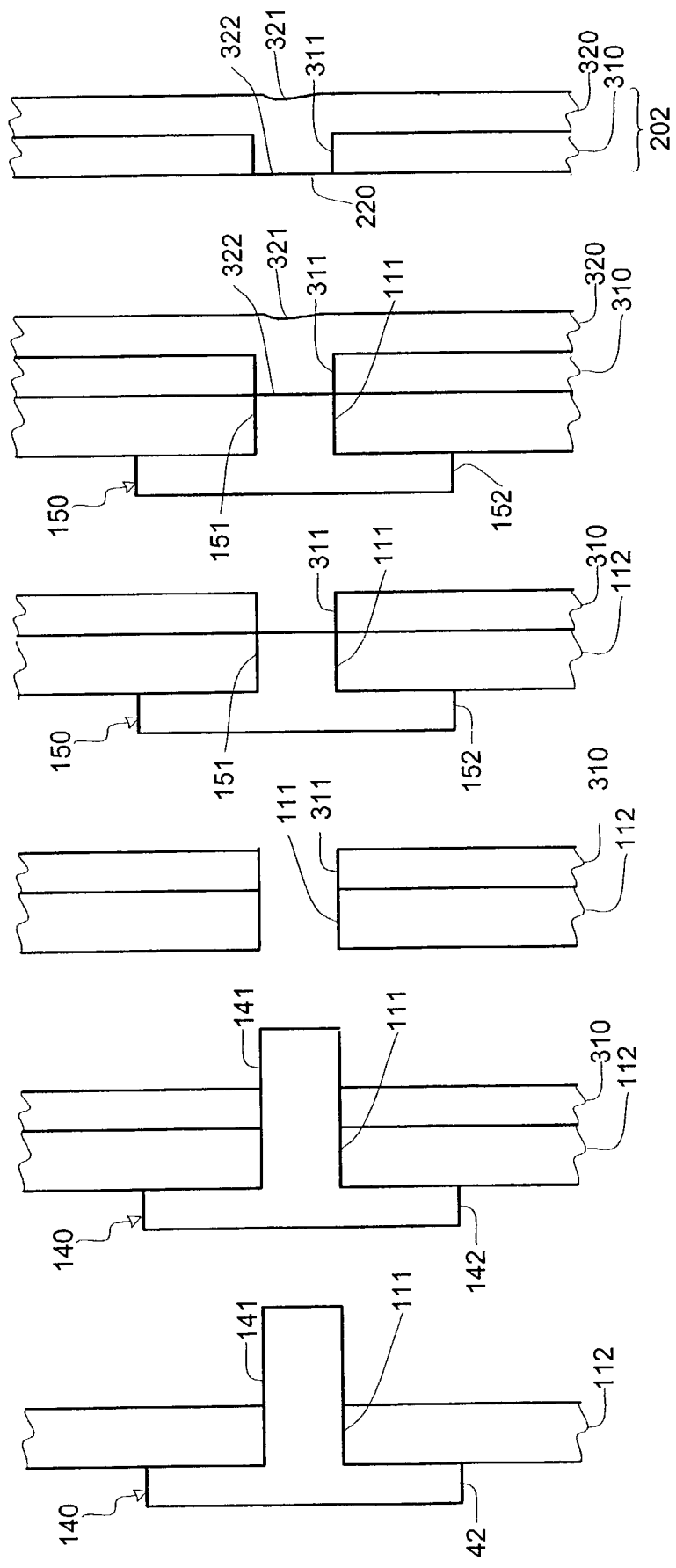

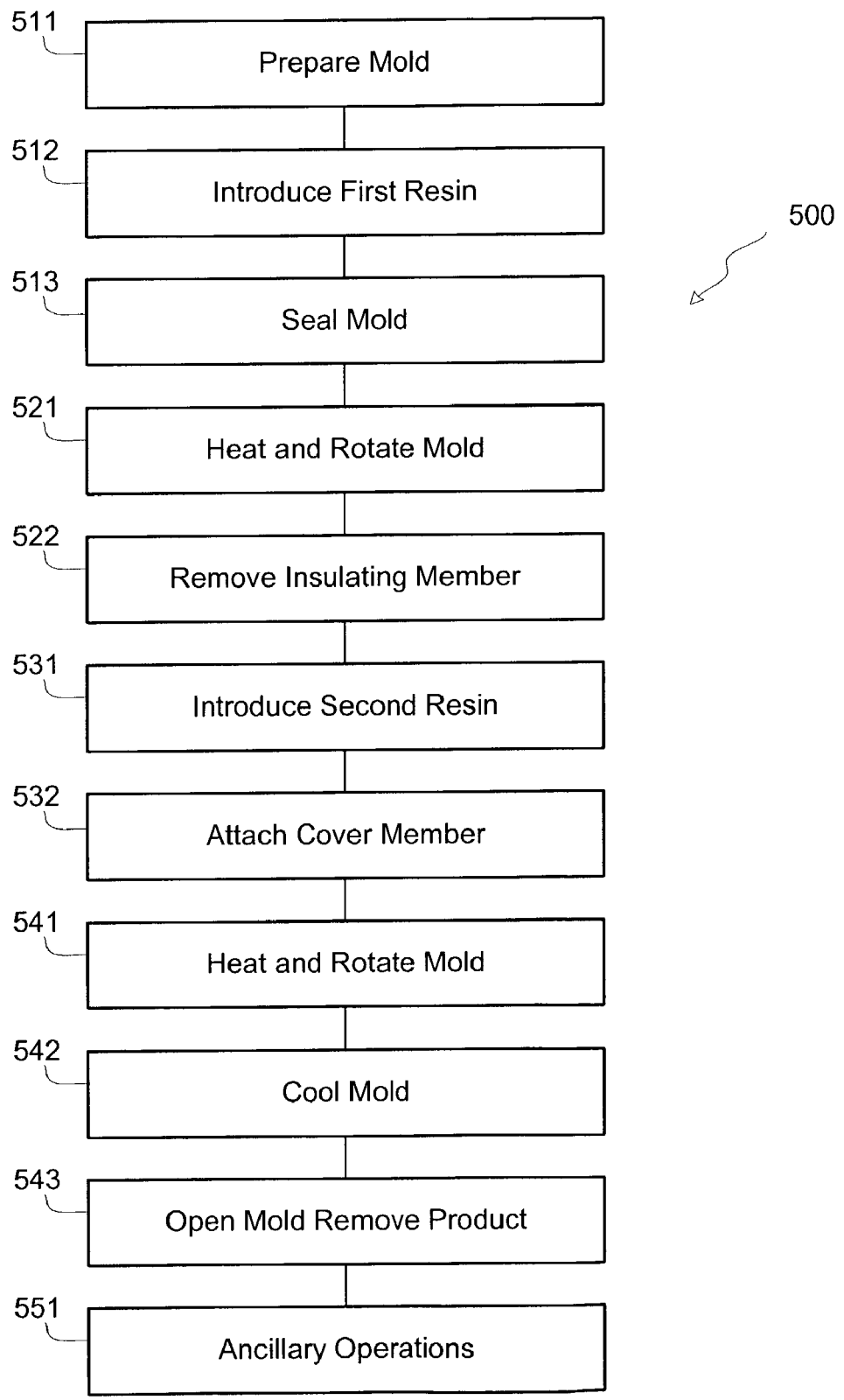

MULTI-LAYER ROTATIONAL PLASTIC MOLDING

TECHNICAL FIELD

The present invention relates to rotational molding of plastics and similar materials, and more particularly concerns multi-layer rotational molding processes and apparatus, and molded products.

BACKGROUND

Rotational molding, or rotomolding, involves heating a plastic resin in a hollow mold while rotating the mold slowly so as to melt and distribute the resin over the inside of the mold by gravity. Although articles of any size can be manufactured, rotational molding can fashion large, sturdy objects beyond the abilities of spin molding or blow molding, which employ centrifugal force or pressure to distribute plastic over the mold walls. Complex one-piece shapes with virtually no internal stress and resistance to stress-cracking are possible. Articles produced by rotational molding also possess uniform wall thicknesses with no thinning at extremities, and excellent load-bearing properties. Some undercutting is possible, without requiring draft angles. Metal inserts can be included as integral parts. A variety of finishes and colors can be accommodated. Tooling costs are low, making rotational molding economical for short runs as well as for volume production. Designs are flexible, with short lead time.

For these technical reasons, as well for product-introduction economic advantages, rotational molding is often employed in manufacturing containers, such as storage and fuel tanks. As one example, fuel tanks for industrial and agricultural vehicles commonly have complex shapes to maximize capacity in oddly shaped available spaces. As another example, tanks up to 2500 or so gallons for storing agricultural seed or chemicals benefit from the large sizes and structural strength afforded by rotational molding.

One shortcoming for rotational molding of containers is the lack of a technique for placing a transparent sight line in an otherwise opaque container for gauging the level of the container's contents without the added cost of mechanical or electrical sensors. Sight lines are common in small blow-molded containers for motor oil and other fluids. However scaling such containers up to the size, strength, and shapes required for many applications is technically difficult or not economically feasible.

Techniques are available for producing multiple-section walls in plastic articles by rotational molding. U.S. Pat. No. 6,383,437 to Thomas G. Grieve proposes a mold having interior removable partition members including thin blades barely touching the mold walls to form multiple spaces closed off from each other within the mold. Different resins are simultaneously melted and fully cured within the separate spaces. The mold is opened, and the partitions and blades removed. A second resin is melted and cured in the reclosed mold. Such a process requires high-precision, condition-sensitive parts that must be accurately assembled and disassembled, especially for complex mold shapes. The second layer must bond to the pieces of the first layer in order to hold them together, yet fully curing the first layer weakens the bond. Curing the first layer and taking the mold completely apart between the first and second layers lengthens the time required to produce an article.

SUMMARY

The present invention offers methods and apparatus for manufacturing a multi-layer plastic article having an area where an outside layer has a gap that reveals a separate inside layer. The outside layer may be optically opaque and the inside layer transparent, to provide a sight line for gauging the level of a container's contents.

A first flowable material is introduced into a mold having an insulating member extending through an aperture or slot into the mold. The mold is rotated and heated to cure the material to a certain point. The insulating member is removed and a second flowable material is introduced into the mold without opening it. A cover member replaces the insulating member. The mold is rotated and heated to cure both materials, then cooled to extract the molded article.

A molded article has an outside layer with a gap, and an inside layer protruding through the gap. The total wall thickness of the article can be substantially the same at the gap as it is in other areas.

DRAWING DESCRIPTION

FIGS. 3A–3E are expanded partial cross sections through the mold of FIG. 1 during different stages of producing the container of FIG. 2.

FIG. 3F is an expanded partial cross section through the container of FIG. 2 after demolding.

FIG. 5 is a flow chart of an example method according to the invention.

DESCRIPTION OF EMBODIMENTS

Figure 2:
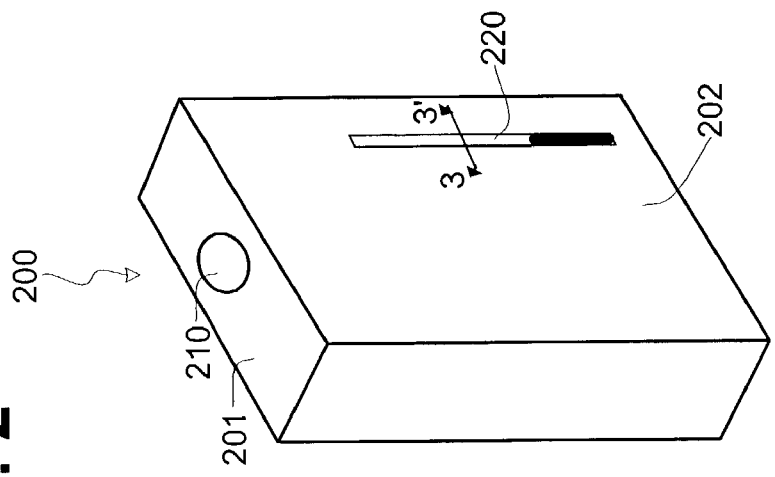
FIG. 2 illustrates a container produced by the mold of FIG. 1.

The following description and the drawing illustrate specific embodiments sufficiently to enable those skilled in the art to practice the invention. Other embodiments may incorporate structural, process, and other changes. Examples merely typify possible variations. Individual components and functions are optional unless explicitly required, and sequences of operations may vary. Portions and features of some embodiments may be included in or substituted for those of others. The scope of the invention encompasses the full ambit of the claims and all available equivalents.

Figure 1:
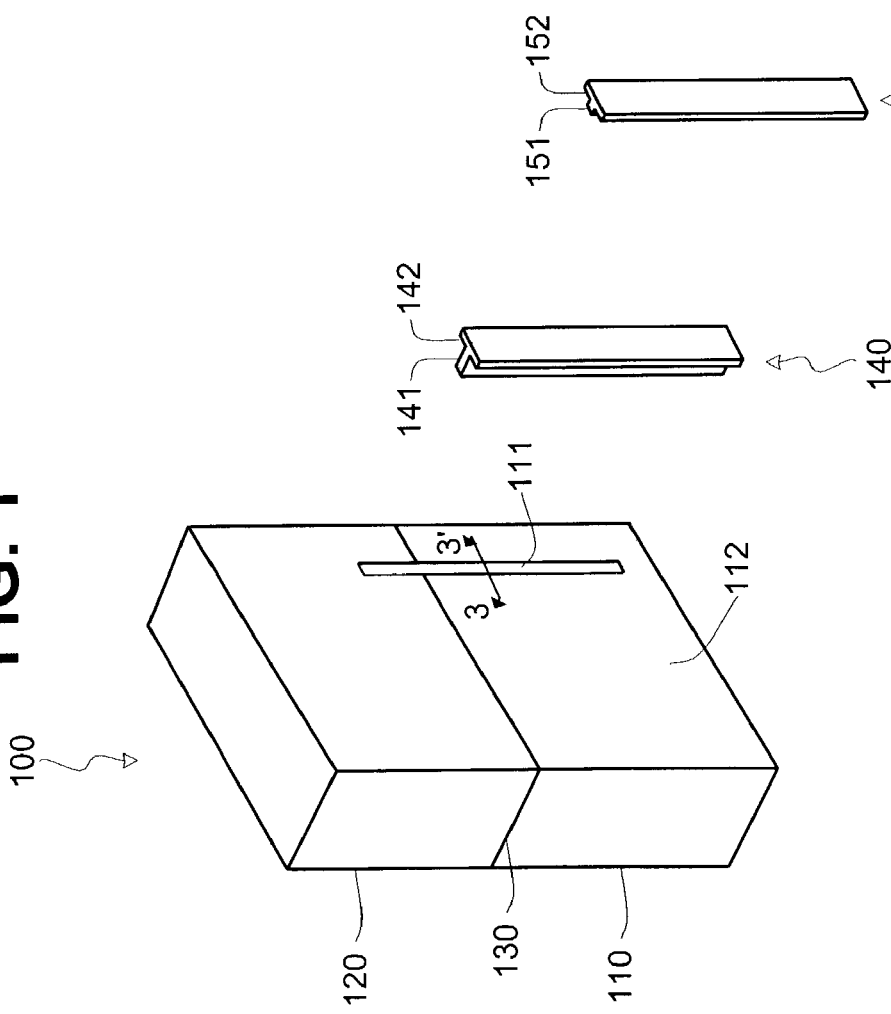
FIG. 1 shows an example of a mold according to the invention.

FIG. 1 shows a simplified embodiment of a hollow mold 100 for producing a plastic container or similar article by a rotational molding (rotomolding) process. Mold 100 has a shell including separable mold halves 110 and 120, made of cast aluminum, sheet steel, or other suitable material. Fasteners or clamps (not shown) hold them together at parting line 130 during the molding process, but allow the mold to be parted for removing the finished molded article. A conventional insert (not shown) inside the mold optionally provides an aperture, fill neck, or some other facility for introducing liquids into the container; other apertures (not shown) may provide liquid outlets, drains, or other functions. Although mold 100 may be any desired size or shape, rotational molding has advantages over blow molding for large articles, for complex shapes, and for producing uniform or thick walls.

Mold half 110 includes an aperture or slot 111 extending through a wall 112 at a location desired for a sight line. Slot 111 may be placed at any desired location in mold 100; a significant vertical extent enhances its usefulness as a sight line for seeing the level of the container's contents, although it may extend only a fraction of the entire height of a container in some applications. For some applications, such as seeing a light or other object located behind the article wall, any orientation may suffice. The slot may be straight or curved, and its profile may follow practically any desired contour if a curved wall 112 should be desired, even around a corner. FIG. 1 shows the slot extending across parting line 130 into the other mold half, although it may be located entirely in one of the mold halves. Multiple sight lines may be placed in either or both of the mold halves.

An insulating member 140 includes a protrusion 141 conforming to the shape of slot 111 and a mount 142 for removably attaching it to wall 112 so that protrusion 141 extends through the wall for a predetermined distance into the interior volume or cavity of mold 100. Insulating member 140 resists adhering to the plastic material to be introduced into the mold. Fabricating member 140 of a material having low thermal conductivity or low heat transfer decreases material build-up on or adherence to member 140. As an example, insulating member 140 may be formed from pieces of Teflon® brand fluoropolymer, publicly available from DuPont. The slipperiness of Teflon® also resists build-up. Increasing the mass of member 140 also decreases adherence during molding, and increasing, say, the volume of mount 142 may enhance this effect. Protrusion 141 normally engages slot 111 fairly tightly, to avoid flash. However, closely equalizing of coefficients of expansion between wall 112 and member 140 is not necessary.

Cover member 150 also has a protrusion conforming to the shape and contour of slot 111. However, protrusion 151 extends less deeply into mold wall 112 than does protrusion 141. Where the sight line is desired to be flush with the outside of a molded article, protrusion 151 may approximate the thickness of mold wall 112. To recess the sight line's exterior surface, protrusion 151 may exceed the wall thickness, although it normally intrudes into the cavity of mold 100 not substantially more than the depth of the outside plastic layer of the article. Cover member 150 carries a mount 152 for removably attaching it to wall 112, preferably in the same way as insulating member 140. In contrast to insulating member 140, cover member 150 preferably has a high heat conductivity. Cover member 150 may be made of any convenient material. Fabricating it of a material similar to that of mold 100, such as aluminum, avoids any problems that might arise from thermal-expansion or heat-transfer differences, and the material will cover and stick to it as it would to the mold walls.

FIG. 2 shows a sample article 200 produced from mold 100, FIG. 1. Article 200 is here shown as a container for holding a liquid when in the upright position illustrated. Liquids may enter and/or exit from a fill aperture 210 on a top wall 201. The container may include additional apertures for other purposes, as described in connection with FIG. 1. In some applications, it is possible that no apertures are required, or that apertures be sealable. Container 200 may also be configured to hold other flowable substances, such as grass cuttings or agricultural seed. Container size is virtually unlimited in the present context. Representative fuel tanks employing the present processes commonly range from about 5 to about 15 gallons. Storage containers for water, chemicals, or other substances may exceed 50 to 2,500 gallons.

Sight line 220 is an elongated transparent area or strip extending vertically up one of the side walls 202. Part of the sight line is portrayed as darkened, to indicate the level of a liquid in container 200. Although illustrated as covering substantially the entire height of wall 202, sight line 220 may be much shorter, for example to indicate only nearly-full or nearly-empty conditions of the container. It may also extend in a path that is neither straight nor entirely vertical. The illustrated container has a simple shape, for clarity. The present invention is highly suitable for complex shapes having compound curves, such as fuel tanks that fit into cramped available spaces of factory vehicles or farm machinery. Sight line 220 can follow any contour of the container, and may extend onto multiple walls, if desired. Articles formed by rotational molding are noted for their strength; the present process forms a sight line whose strength is comparable to the wall strength of article 200, without compromising structural integrity in the area of feature 220.

FIGS. 3A–3E portray partial cross sections of mold 100, along line 3–3' of FIG. 1, at various stages of manufacturing container 200 in mold 100. The scale is expanded for clarity. FIG. 3A depicts insulating member 140 inserted through wall slot 111 in wall 112, and tightly secured to it by fasteners (not shown) on mount 142 or by clamps. A charge of resin for an outside layer of plastic is inserted into the mold. This plastic usually contains pigments to render it opaque, for cosmetic reasons and to limit exposure to ultraviolet or other radiation. In FIG. 3B, the charge has been melted and distributed on the interior of mold wall 112 as outside layer 310. The tip of protrusion 141 extends through wall 112 and into the mold cavity beyond the thickness of outside layer 310. In a typical application, say a fuel or storage tank, the thickness of layer 310 is commonly about 0.06 inch or greater. Protrusion 141 need not extend any farther than the top of this layer. As a practical matter, however, exceeding the nominal thickness of layer 310 by about 600% provides a safety factor to prevent any material buildup from forming a skin over the top of the protrusion. The protrusion does not, however, extend all the way across the mold or touch an opposing mold wall spaced away from slot 111 so as to form a compartment or otherwise block the coverage of layer 310 except at slot 111. In FIG. 3C, insulating member 140 has been removed after outside layer 310 has coated the mold surfaces, leaving gap 311 at the location of mold slot 111. The layer does not run into the gap because it has a fairly high viscosity, and it sticks to the walls of mold 110 at this point in the process.

A charge of resin for a second layer can be introduced through slot 111 and gap 311. Other openings, such as aperture 210, FIG. 2, may also offer a convenient introduction point in some applications. There is no need for a drop-box or other additional mechanism to introduce the second-layer material, although such means may be employed if and when desirable for other reasons.

FIG. 3D shows cover member 150 inserted into slot 111 and attached to mold 100; the fasteners or clamps used to mount member 140 can often serve for member 150 as well. In FIG. 3E, the second charge has melted and distributed itself as a transparent inside layer 320. Because layer 310 has not yet fully cured at this time, layer 320 may form a strong bond to it, both between the layers and at the sides of gap 311 in the outside layer, for compatible materials; other applications may not require a bond. The outside surface 322 extends to the top of protrusion 151 of cover member 150. In many applications, the top of protrusion 151 is flush with the inside surface of mold wall 112, so that the outside surface 322 of sight line 220 is flush with the outside of layer 310 in the finished article, as shown in FIG. 2F. However, some product designs may recess the outside of the sight line into layer 310 or extend it beyond the outer surface of layer 310, by lengthening or shortening protrusion 151.

For typical tanks described just above, representative thicknesses of layer 320 may range from about 0.065 inch to about 0.5 inch. Total wall thickness of both layers 310 and 320 may typically encompass a range from about 0.1 inch to about 0.5 inch, although thinner or thicker walls may be desirable in some applications, and 1 inch walls are feasible. Fuel tanks and medium-size storage tanks may typically have a wall thickness in the range of 0.3 inch. Because colored resins cost more than the naturally transparent resins, many applications tend to minimize the thickness of outside layer 310; however, any desired ratio of layer thicknesses is feasible.

FIG. 3F shows the finished wall 202 of container 200 after mold 100 has been cooled and parted to release the completed article 200, taken along line 3–3' of FIG. 2. The total thickness of wall 202 at sight line 220 can be substantially the same as in the remainder of the container; that is, layer 320 flows into gap 311, FIG. 3E, to form an extended plug, and then fills behind the plug substantially level with the inside surface of layer 320. For dimensions commonly employed in sight lines, the total wall thickness may vary less than 20% in the area of sight line 220 from the nominal total thickness of layers 310 and 320 in other areas, or may be greater than 80% of this thickness. The level of liquid or other contents in the interior of container 200 is perceivable through the sight line.

Figure 4:
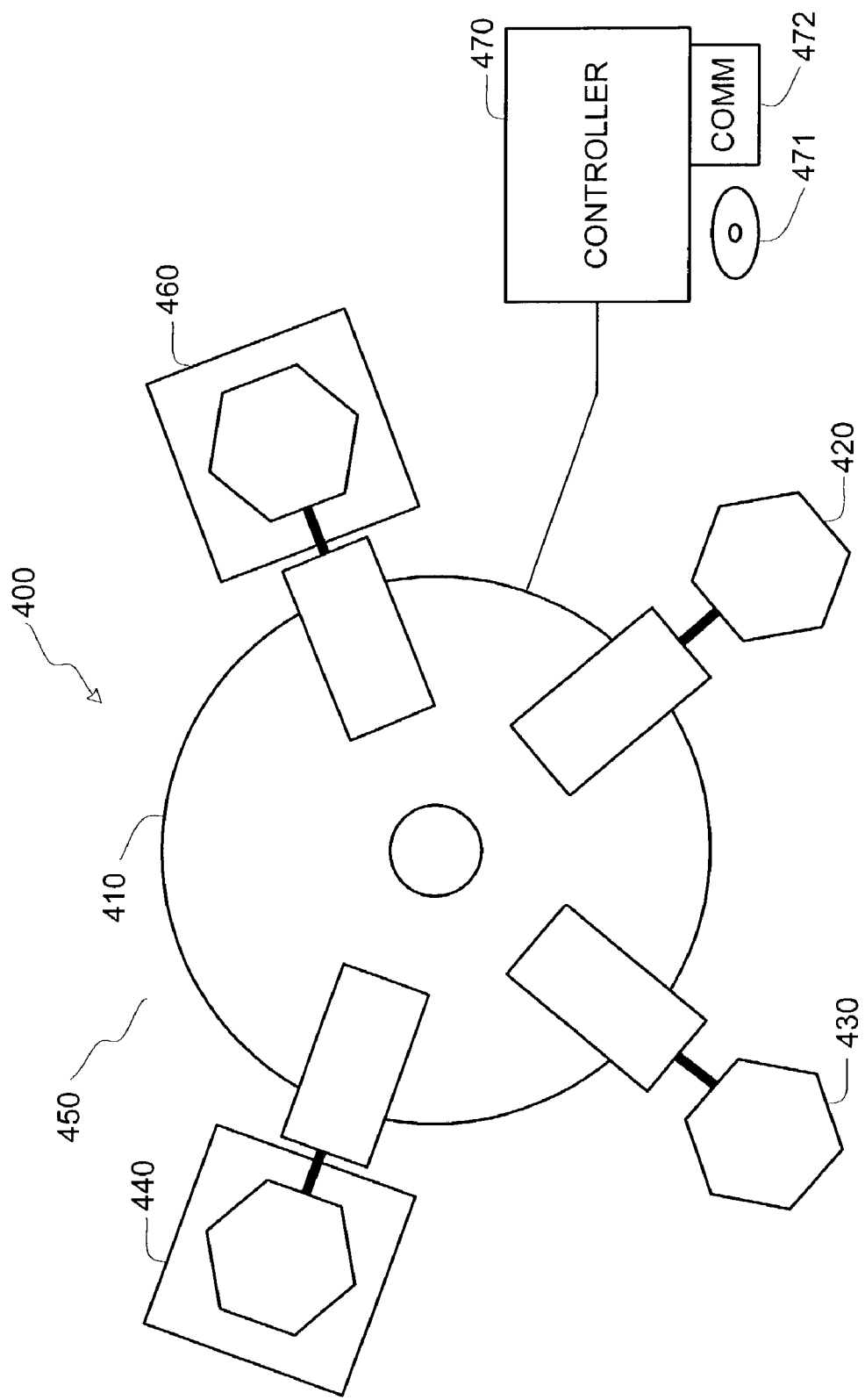
FIG. 4 is a schematic of rotational molding apparatus useful in practicing the invention.

FIG. 4 is a schematic representation of a rotational molding machine 400 that can accept and process mold 100. The invention does not require any unconventional elements in machine 400 itself, and any acceptable apparatus may be employed.

Machine 400 has a central area 410 for transferring a mold such as 100, FIG. 1 among a number of stations 420–460 for carrying out the operations of a rotational molding process. Service stations 420 and 430 provides facilities for positioning graphics and inserts (not shown) on the inside of a mold and for introducing a charge of plastic resin before the mold is closed. Oven 440 heats a mold as machine 400 rotates it biaxially so as to melt the resin and distribute it over the inside mold surface. The melted resin adheres to the mold. Intermediate station 450 includes fans or similar devices for slow air cooling of a mold. Cooler 460 usually includes fans and a water spray for cooling a mold to a temperature low enough to part the mold to release the completed article after transfer to service station 420. A controller 470 can be programmed to transfer a mold to various stations at various times in selectable sequences. It also specifies heating and cooling times and speeds in the two rotation axes. A storage medium such as a magnetic or optical disk 471 may hold instructions and data for programming controller 470. Alternatively, a communications medium 472 such as the Internet may provide instructions and data.

FIG. 5 is a flowchart 500 illustrating an example of a method for producing a molded article such as a container having a transparent sight line. The sequence and physical location of operations are for illustration only; others may serve as well.

A mold such as 100, FIG. 1, is prepared in block 511. This may include inserting insulating member 140 through slot 111 and attaching or sealing it to the mold so that plastic will not leak into the slot. If necessary, the mold is opened at parting line 130 and cleaned or otherwise prepared for molding another article. These preliminary operations may be performed remotely and/or by persons other than the ones who perform the remaining operations in process 500. For example, a mold manufacturer or a customer may perform them.

Block 512 introduces a first charge of plastic resin into the mold, for forming outside layer 310, FIG. 3. In general, any resin suitable for conventional rotational molding is suitable for the present process. Examples of suitable resins include those for polyethylene, polypropylene, and polyamides such as nylon. Colored resins of dry-blended and compounded PE and compounded XLPE are suitable, as are other types. These materials provide high strength, which is particularly advantageous for containers such as large tanks for industrial or vehicular use. For most applications, the resin produces an opaque plastic, when mixed with conventional pigments for a desired color. Rotational molding can also exploit rubber and other elastomers, as well as certain types of flowable ceramics. Therefore, the terms "plastic" and "resin" in the context of layers 310 and 320 include all materials having a flow consistency and other chemical and mechanical properties compatible with processes such as 500 and an intended application of the finished article.

In block 513, the mold is sealed and transferred to another station, such as 430, FIG. 4. If desired, the resin charge could be introduced after the mold is sealed, through slot 111 before member 140 is inserted or by other means. FIG. 3A shows a portion of mold 100 at stages 511–513 of the illustrative method 500.

Block 521 rotates mold 100 containing the first resin and including insulating member 140. Rotational molding usually rotates a mold biaxially, frequently at different speeds for the axes, and some mold configurations may only require rotation about a single axis for one or both layers. Rotation speeds distribute the resin charge primarily or entirely by gravitation rather than by centrifugal force. The mold is heated in an oven as it rotates. Temperatures, rotation speeds, and cook time depend upon the material in the resin charge, the desired wall thickness of the product, and the thickness of the mold wall, among other factors. Heating and rotation cause the material to flow around the mold walls, coat them, and stick to them. The low thermal conductivity of insulating member 140, however, resists material buildup and adherence to it, and its composition, mass, and shape may enhance these effects.

Some of the parameters in operation 521 may differ from conventional practice. In particular, cook time is preferably just sufficiently long to lay down or flow all of the material into a layer on the mold walls, but not long enough to fully cure the material. "Fully cured," in this context, refers to a point at which the physical and chemical properties of the material are substantially those of the finished article; "partially cured" means less than fully cured. Some materials undergo a chemical reaction in the mold during curing. Some undergo physical entanglement among molecules or other mechanical transformations. Some materials break up or knead out air bubbles. For fusible resins, operation 521 can be terminated before the material sinters. ("Sintering" here means that the particles are fused together into a porous network, although the mass as a whole is not melted.) Those in the art understand how to calculate the applicable parameters and program them into an apparatus such as 400, FIG. 4. As an example, a 0.1 inch thick linear low-density polyethylene (LLDPE) resin may cook for about 9 minutes at a temperature of about 540° F., with a biaxial rotation speed of about 8×2 rpm to coat the mold walls sufficiently. In comparison, processing the same material in conventional practice would require about 20 minutes at this temperature. That is, embodiments of the present process heat this first charge for less time than in normal practice, although temperatures may be similar to those of conventional processes for the particular materials employed. More broadly, time/temperature regimes of about 5 to about 15 minutes, at temperatures of about 375 to about 650° F. are suitable for method 500 using polyethylene, polypropylene, or nylon or similar materials.

Block 522 backs the mold 100 containing the partially cured first layer 310, FIG. 3, out of oven 440 to a service station, and removes insulating member 140 from the mold. Depending upon its particular method of attachment, it may be unfastened, unclamped, etc., and withdrawn from slot 111, FIG. 1. The viscosity of the layer material retards it from flowing into the slot; if desired, the mold can stop rotation with the slot at or near the top to retard flow even more. FIGS. 3B and 3C show a portion of mold 100 at stages 521–522 of method 500.

In contrast to other two-layer processes, method 500 has no inherent requirement for cooling the mold between forming the first and second layers. Any time interval or cooling occurs only for the purpose of removing member 140 and inserting member 150. Some automated machinery may not need to cool the mold, or even remove it from oven 440, in order to accomplish operations 522, 531, and 532, so that operations 521 and 541 constitute a single continuous operation. In addition to reducing the overall process duration, reducing time and cooling between operations 521 and 541 may enhance bonding between layers 310 and 320 for some materials.

At block 531, a second resin charge is introduced into mold 100. Because insulating member 140 has been removed, the second charge can be placed inside the mold directly through slot 111. The resin employed for operation 531 is transparent for many applications of process 500. Because most suitable resins are naturally transparent, block 531 may employ any of the example materials mentioned above, and others as well. The second charge may comprise the same type of resin as that of the first charge, but without pigment.

The term "transparent" includes translucent. This term—and "opaque" as well—may apply to any desired radiation wavelength in addition to visible light, such as ultraviolet and microwaves. Some applications, such as backlit signage, may employ a second layer 320 having a different color, or having optical or other properties different from those of layer 310.

Block 532 attaches cover member 150 by attaching it to mold wall 112, and may employ the same fasteners or clamps as those used for member 140. Protrusion 152 may extend into or through slot 111, as noted in connection with FIG. 3D, which shows a portion of the mold at stages 531–532 of representative method 500.

Block 541 heats and rotates mold 100 containing the second resin charge and including cover member 150. Temperatures, rotation speeds, and cook time depend upon the material in the second charge. Cook time and rotation speeds are long enough to lay down, melt, and fully cure the resin into layer 320. Those in the art understand how to calculate and program these parameters. Following the above example, a 0.1 inch thick LLDPE resin may cook for about 10 minutes at a temperature of about 540° F., with a biaxial rotation speed of about 8×2 rpm. In many cases, the cook time for the second layer is slightly higher than that for the first layer. More broadly, time/temperature regimes of about 5 to about 15 minutes, at temperatures of about 375 to about 650° F. are suitable for plastic materials of polyethylene, polypropylene, or nylon. During this operation, outside layer 310 becomes fully cured.

For some combinations of materials, the second layer 320 bonds to first layer 310. Tanks for flammable or toxic contents, for example benefit from the strength and structural integrity that tight bonding provides. Bonding between the layer materials may be mechanical or chemical, depending upon the specific layer materials and their polymerization properties. Other applications may not require complete or even partial interlayer bonding. In some cases the shape of the molded article itself locks the inner layer in position by preventing it from moving inside the outer layer, without any overt bond between the materials themselves.

Block 542 cools the mold containing the fully cured layers 310 and 320. If similar materials are used for the two layers, the bond between them may be as strong as the materials themselves, and the two layers may form physically a single entity without a perceptible joint, including at the edges of feature 220, FIG. 2; other applications may neither require nor produce an interlayer bond. Cooling continues until the mold can be safely opened without damaging it or the article. Cooling time is about the same as that for a conventional structure having the same materials and total wall thickness, and may include air and/or liquid cooling. FIG. 3E illustrates a portion of mold 100 at these stages.

Block 543 then unseals or opens mold 100 at parting line 130, and demolds the hollow article such as 200 by removing it in any conventional manner. FIG. 3F shows a small portion of article 200 at this stages 541–543.

Block 551 performs any post-molding secondary operations. For example, flash can be trimmed, holes drilled, features machined, and so forth.

What is claimed is:

1. A method for rotation molding an article, comprising the steps of:
    introducing a first flowable material into a mold having an insulating member mounted on a mold wall and having a protrusion extending through an aperture in the mold wall;
    heating and rotating the mold so as to lay down the first material as a first layer having a thickness small enough so as to form a gap at the insulating member;
    removing the insulating member so as to expose the gap;
    introducing a second flowable material without opening the mold;
    heating and rotating the mold so as to fully cure the second material as a second layer over the first layer and in the gap;
    cooling the mold so as to solidify both the first and second layers,
    where the second material is introduced into the mold through the aperture.

2. The method of claim 1 where the mold does not cool appreciably between the first and second heating operations.

3. The method of claim 1 where the first heating operation does not fully cure the first material.

4. The method of claim 3 where the first material fully cures during the second heating operation.

5. The method of claim 1 where at least one of the rotation operations is biaxial.

6. The method of claim 1 where all of the operations are performed in the order listed.

7. The method of claim 1 where the first material is a plastic resin.

8. The method of claim 7 where the first heating operation does not sinter the first material.

9. The method of claim 1 where the second material is a plastic resin.

10. The method of claim 9 where the second layer bonds to the first layer.

11. The method of claim 10 where the first and second layer bond integrally, without a perceptible joint.

12. The method of claim 1 where the second layer is transparent.

13. The method of claim 12 where the aperture forms an elongated sight line.

14. The method of claim 13 where the aperture runs substantially vertically when the article is in an upright position.

15. The method of claim 1 where the insulating member has a low thermal conductivity.

16. The method of claim 15 where the insulating member is made of a fluorocarbon.

17. The method of claim 1 further comprising covering the aperture in the mold wall before the second heating operation.

18. The method of claim 17 where the aperture in the mold wall is covered with a cover member having a high heat conductivity.

19. A method for forming a plastic container having a transparent sight line for measuring the level of a substance in the container, the method comprising:
   introducing a first plastic material into a mold having an elongated insulating member in a position desired for the sight line, the insulating member mounted on a mold wall and having a protrusion extending through a slot in the mold wall to minimize buildup of the first plastic material thereon, where the insulating member is removable from outside of the mold, without opening the mold;
   heating and rotating the mold so as to partially cure the first material as an outside layer on the mold wall with a gap at the protrusion;
   removing the insulating member so as to expose the slot and the gap;
   introducing a second, transparent plastic material into the mold through the slot when the insulating member is removed;
   covering the slot;
   heating and rotating the mold so as to distribute the second material as an inside layer over the outside layer and in the gap, and so as to fully cure both the first and second materials;
   cooling the mold and releasing the container therefrom.

20. The method of claim 19 where the first heating and rotating operation is sufficient to distribute the first material on the mold wall, but does not sinter it.

21. The method of claim 20 where the second material sinters during the second heating operation.

22. The method of claim 19 where the mold is not cooled between the first and second heating operations.

23. The method of claim 19 where the insulating member does not contact any opposing portion of the mold wall spaced away from the slot.

24. The method of claim 19 where the insulating member resists buildup of the first material thereon.

25. The method of claim 19 where the insulating member is at least partially fabricated of a fluoropolymer.

26. The method of claim 19 where the insulating member has a low thermal conductivity.

27. The method of claim 19 where the slot is covered with a cover member attachable to the mold without opening it.

28. The method of claim 27 where the cover member is substantially flush with the inside of the mold wall in the region of the slot.

29. The method of claim 19 where the total thickness of the wall of the article in the region of the sight line is greater than about 80% of a nominal total thickness of the article wall in other regions thereof.

30. The method of claim 19 where the second heating operation bonds the inside layer to the outside layer.

31. The method of claim 1, further comprising covering the gap after introducing the second flowable material.

32. The method of claim 31 where the gap is covered by a member having a high heat conductivity.

33. The method of claim 31 where the gap is covered by attaching a member to the mold from outside the mold.

34. The method of claim 31 where the gap is covered by a member having a protrusion flush with an inside surface of a wall of the mold.

35. The method of claim 31 where the second layer is transparent.

36. The method of claim 35 where the aperture forms an elongated sight line.

* * * * *